Sept. 1, 1931. F. C. BAKER ET AL 1,821,133
APPARATUS FOR TREATING EMULSIFIED OIL
Filed Nov. 16, 1927  2 Sheets-Sheet 2
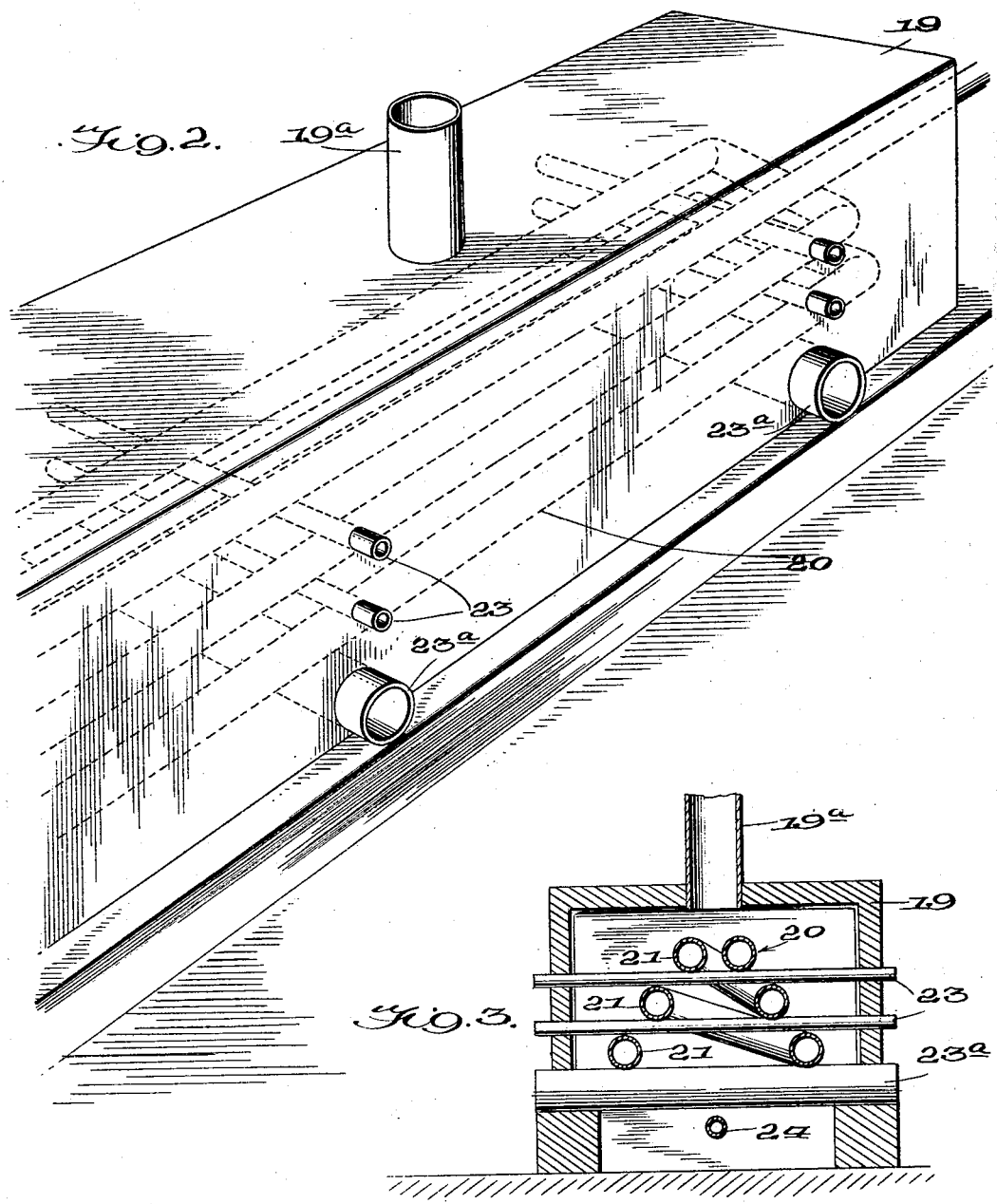

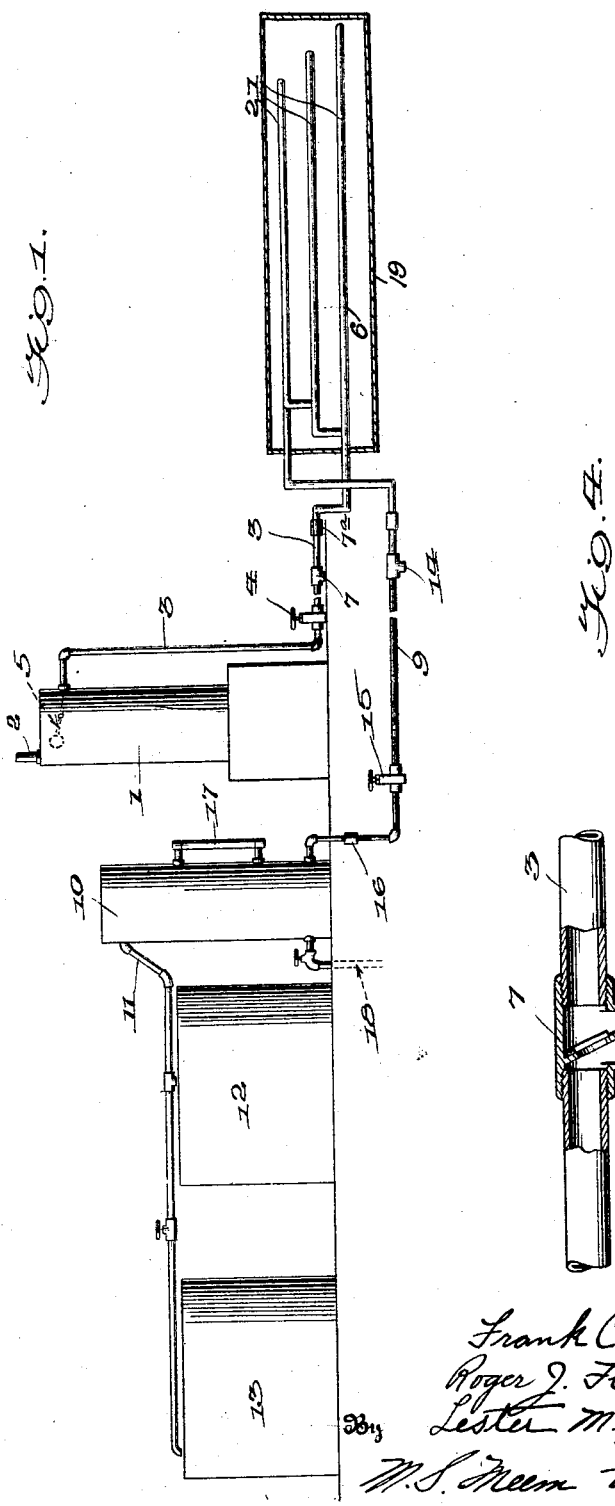

Patented Sept. 1, 1931

1,821,133

UNITED STATES PATENT OFFICE

FRANK C. BAKER, ROGER J. FLECKENSTEIN, AND LESTER M. LANDMAN, OF FORT WORTH, TEXAS, ASSIGNORS TO TEXAS PACIFIC COAL AND OIL COMPANY, OF FORT WORTH, TEXAS, A CORPORATION OF TEXAS

APPARATUS FOR TREATING EMULSIFIED OIL

Application filed November 16, 1927. Serial No. 233,699.

This invention relates to a treating system for making salable pipe line oil, or emulsified crude oil, such as is frequently produced in many fields.

The primary object of the invention is to provide an apparatus for heat treating such oil on its way from the wells to storage, and for raising the temperature of the oil without employing live steam or coils heated by steam from boilers. This makes the system especially useful in those fields where there is a scarcity or very poor quality of water for the boilers, and as a matter of fact, the new system eliminates the use of boilers.

A further object is to separate from crude oil, the water, paraffin, asphalt and bottom sediment, so as to raise the gravity and make such oil a more valuable product.

A still further object is to furnish a system in which the oil will flow by gravity through the heating unit or coil which is directly heated by hydrocarbon burners or the like; such heating raising the temperature of the oil to a point less than 212° F., and preferably to about 140° F. The oil thus heated is fed into a settling tank to permit the water, etc., to separate from the oil by stratification, the oil flowing from the top of the settling tank into suitable storage tanks where it is allowed to settle.

A further object is to furnish a heater for such system, of novel and simple construction, which may be inexpensively manufactured, and is of durable construction.

With the foregoing objects outlined, and with other objects in view which will appear as the description proceeds, the invention consists in the novel features hereinafter described in detail, illustrated in the accompanying drawings, and more particularly pointed out in the appended claims.

Referring to the drawings,

Fig. 1 is a side view of the improved system.

Figs. 2 and 3 are enlarged perspective and vertical sectional views respectively of the heater forming part of such system.

Fig. 4 is an elevation, partly in section of a detail.

In the drawings, 1 designates a flow tank to which the emulsified crude oil or the like being produced at the well, flows through a lead line 2. This tank will, of course, be of proper capacity to take care of the amount handled by the lease owner.

From the flow tank, the oil flows by gravity through the line 3, which is provided with a gate valve or the like 4. As it is desired in the present system to render the operation as cheap as possible, a static head of oil in the flow tank is employed for circulation purposes, instead of a pump, and to insure that this static head is always sufficient to flow the oil through the system, a float valve 5 is arranged in the flow tank at the inlet end of the pipe 3. Due to this valve, the oil is cut off from the pipe 3 when an insufficient static head is present in the flow tank to take care of the circulation. It will be observed that the pipe 3 is connected to flow tank below the top of the latter, so as to allow for the static head.

The line 3 is sufficiently large to handle the fluid produced, and the fluid flows from this line into a heater 6, the details of which will be described later on.

A check valve 7, opening toward the heater, is arranged in the line 3, and a union 7a is provided at the end of this line for attachment to the inlet of the heater. The check valve is shown in detail in Fig. 4.

As the oil flows through the heater, its temperature is raised, but preferably not above 140° F., and the heated oil flows through an insulated pipe 9 to a separating tank 10, where the water and the like, due to the heat treatment, separate from the oil, the oil passing on through a line 11 into the storage tanks 12 and 13.

The pipe 9 has a check valve 14, similar to the valve 7, but opening toward the separating tank, and gate valve 15 is also provided on the pipe 9. A union 16 is employed in connecting the pipe 9 to the separating tank.

The latter has a gauge glass 17 to permit the operator to observe the height of the water, etc., and this water may be drained off through a conduit 18.

The heater 6 forms an important part of the invention, as it is especially designed to heat the oil without the use of steam, as the oil flows through the heater. This heater preferably consists of a housing 19 of concrete or brick construction, having a chimney 19a, and this housing contains the coil 20 through which the oil flows. The coil is made of pipes of sufficient size, and the individual loops are rectangular in form. The coil consists of a series of tiers 21, each superposed, one of which is projected inward the width of its own diameter, so as to allow heat from below to envelope all parts of the heater. The coils are spaced slightly in the vertical direction, and hollow supports, such as pipes 23, extend through these spaces to support the coils, and each pipe has its ends extending through holes in the wall of the housing, so as to allow cold air to pass through and prevent the supports from sagging. The entire heater may be elevated sufficiently by mounting the same on lengths of casing 23a, to permit a burner 24 to be placed beneath the coil, and such burner is preferably thermostatically controlled, so as to prevent the oil from being heated much above 140° F.

We have found from actual practice, that when crude oil, admixed with water, paraffin, asphalt and bottom sediment, is passed through this system, the low heat treatment causes the elements to stratify without the production of gas, and consequently, we are able, by the use of our apparatus, to make a crude oil salable without the necessity of using steam for heat, and compressors for recovering gases.

Those skilled in the art will readily understand from the foregoing description, the manner of constructing our apparatus, and the way in which to operate the system, and we are aware that changes may be made in the details disclosed without departing from the subject matter claimed.

What we claim and desire to secure by Letters Patent is:

1. An apparatus for separating water from crude oil, comprising a flow tank, a line connected to said tank at a point spaced from the top of the latter, said line and tank being arranged to permit the oil to flow through the line under hydrostatic pressure, a heating coil of pyramidal form, formed by a series of horizontal loops of different sizes arranged in tiers, said coil being operatively connected to the line and arranged to permit the oil to flow therethrough under such hydrostatic pressure, means arranged exteriorly of the coil for applying heated gases directly to said coil, a separating tank, a pipe connecting the coil to the separating tank, a conduit for discharging oil from the upper portion of the separating tank, and another conduit for discharging water from the lower portion of the separating tank.

2. An apparatus as claimed in claim 1, in which the heating coil is of pyramidal form and consists of a series of tiers of said loops, the tiers gradually decreasing in size from the bottom to the top of the coil, a housing enclosing the coil, and hollow horizontally arranged supports carried by the wall and supporting said loops, the ends of the supports being located outside the wall and being opened to permit atmospheric cooling of the supports.

3. In an oil separating device, the combination of a source of supply and of a pipe line connected therewith, for conducting oil to a heating unit, a heating unit, a coil of pyramidal form located therein, said coil consisting of a series of tiers of loops of different sizes, graduated so that the largest loop is on the bottom, with means for separating, spacing and supporting the adjacent tiers of loops from each other, said supporting means running transverse of the longest dimension of each loop of the coil, and extending outside of the heating unit, with means for playing the products of combustion on the coil and its supporting means to heat the oil contained within the coil.

In witness whereof we have affixed our signatures this 17 day of Oct., 1927.

FRANK C. BAKER.
ROGER J. FLECKENSTEIN.
LESTER M. LANDMAN.